(12) United States Patent
Miyashita

(10) Patent No.: US 9,831,711 B2
(45) Date of Patent: Nov. 28, 2017

(54) FOREIGN OBJECT DETECTION DEVICE, FOREIGN OBJECT DETECTION METHOD, AND NON-CONTACT CHARGING SYSTEM

(71) Applicant: PANASONIC INTELLECTUAL PROPERTY MANAGEMENT CO., LTD., Osaka (JP)

(72) Inventor: Norihiro Miyashita, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 216 days.

(21) Appl. No.: 14/829,576

(22) Filed: Aug. 18, 2015

(65) Prior Publication Data

US 2015/0355359 A1 Dec. 10, 2015

Related U.S. Application Data

(63) Continuation of application No. PCT/JP2014/000831, filed on Feb. 18, 2014.

(30) Foreign Application Priority Data

Feb. 19, 2013 (JP) .................................. 2013-029601

(51) Int. Cl.
*H02J 7/00* (2006.01)
*H02J 7/02* (2016.01)
(Continued)

(52) U.S. Cl.
CPC ............... *H02J 7/025* (2013.01); *G01V 3/10* (2013.01); *H01F 27/28* (2013.01); *H01F 38/14* (2013.01);
(Continued)

(58) Field of Classification Search
CPC .......... H02J 7/025; H01F 38/14; Y02T 90/122; B60L 11/182; Y02E 60/12
(Continued)

(56) References Cited

U.S. PATENT DOCUMENTS 6,107,924 A 8/2000 Kasai et al.
2006/0012366 A1* 1/2006 Feldman .................. G01V 3/14
324/310
(Continued)

FOREIGN PATENT DOCUMENTS

CN 1139210 A 1/1997
CN 102694423 A 9/2012
(Continued)

OTHER PUBLICATIONS

English translation of Chinese Search Report issued in Application No. 201480008212.dated Jan. 24, 2017.
(Continued)

*Primary Examiner* — Arun Williams
(74) *Attorney, Agent, or Firm* — McDermott Will & Emery LLP

(57) ABSTRACT

Disclosed herein is a foreign object detector to detect a foreign object while distinguishing metal from water. The foreign object detector includes a detection coil; a transmitting circuit generating RF power of a predetermined frequency; a directional coupler outputting the RF power supplied from the transmitting circuit to the detection coil, and extracting reflected power that is a power component reflected by the detection coil; and a detection circuit receiving the reflected power extracted by the directional coupler, and detecting the foreign object by sensing a change in the frequency characteristic of the reflected power.

7 Claims, 11 Drawing Sheets

(51) Int. Cl.
*H01P 5/18* (2006.01)
*H01F 27/28* (2006.01)
*H01F 38/14* (2006.01)
*H02J 5/00* (2016.01)
*G01V 3/10* (2006.01)
*H02J 17/00* (2006.01)

(52) U.S. Cl.
CPC ............... *H01P 5/18* (2013.01); *H02J 5/005* (2013.01); *H02J 17/00* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 2007/0069687 | A1* | 3/2007 | Suzuki | H02J 7/0036 320/108 |
| 2008/0197712 | A1* | 8/2008 | Jin | H02J 5/005 307/104 |
| 2010/0201189 | A1* | 8/2010 | Kirby | H04B 5/0037 307/9.1 |
| 2011/0241440 | A1* | 10/2011 | Sakoda | H02J 5/005 307/104 |
| 2012/0001493 | A1 | 1/2012 | Kudo et al. | |
| 2012/0038317 | A1 | 2/2012 | Miyamoto et al. | |
| 2012/0175967 | A1 | 7/2012 | Dibben et al. | |
| 2012/0242285 | A1 | 9/2012 | Jung et al. | |
| 2013/0063082 | A1* | 3/2013 | Lee | H02J 7/025 320/108 |
| 2013/0099592 | A1 | 4/2013 | Abe | |
| 2013/0169062 | A1 | 7/2013 | Maikawa et al. | |

FOREIGN PATENT DOCUMENTS

| | | |
|---|---|---|
| DE | 20 2011 050 264 U1 | 8/2012 |
| EP | 2 503 663 A1 | 9/2012 |
| JP | 03-194817 A | 8/1991 |
| JP | 09-043007 A | 2/1997 |
| JP | 11-304764 A | 5/1999 |
| JP | 2000-031808 A | 1/2000 |
| JP | 2012-016125 A | 1/2012 |
| JP | 2012-016171 A | 1/2012 |
| JP | 2012-249401 A | 12/2012 |
| WO | 2012/002063 A1 | 1/2012 |
| WO | 2012/173128 A1 | 12/2012 |

OTHER PUBLICATIONS

International Search Report and Written Opinion issued in corresponding International Patent Application No. PCT/JP2014/000831, dated Mar. 18, 2014; 9 pages with English translation of International Search Report.

Extended European Search Report issued in corresponding European Patent Application No. 14753855.7, dated Feb. 5, 2016.

\* cited by examiner

— WHEN THERE IS NEITHER A FOREIGN
   OBJECT NOR RAIN WATER
- - - - WHEN THERE IS A FOREIGN OBJECT (METAL)
······· WHEN THERE IS RAIN WATER

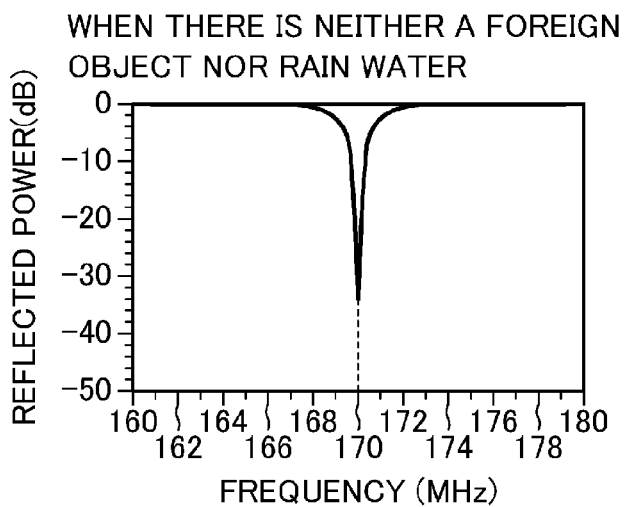
FIG.11A WHEN THERE IS NEITHER A FOREIGN OBJECT NOR RAIN WATER
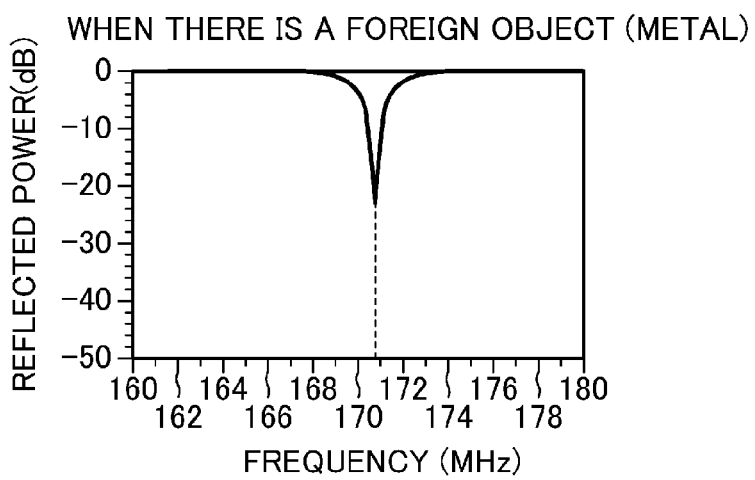
FIG.11B WHEN THERE IS A FOREIGN OBJECT (METAL)
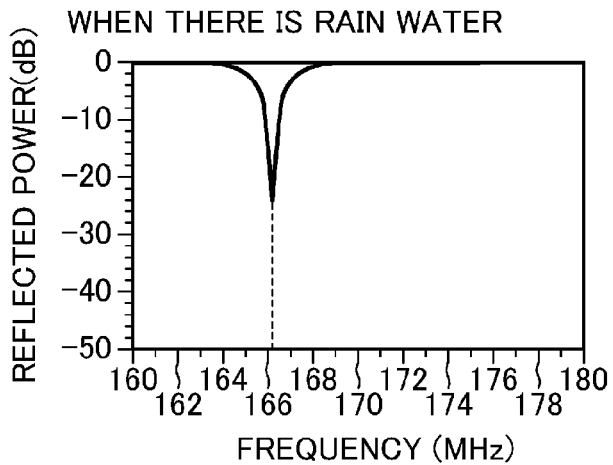
FIG.11C WHEN THERE IS RAIN WATER

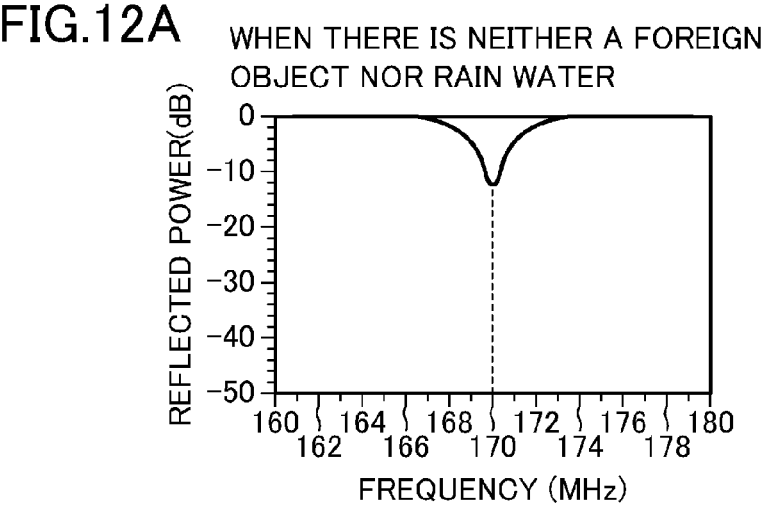
FIG.12A  WHEN THERE IS NEITHER A FOREIGN OBJECT NOR RAIN WATER
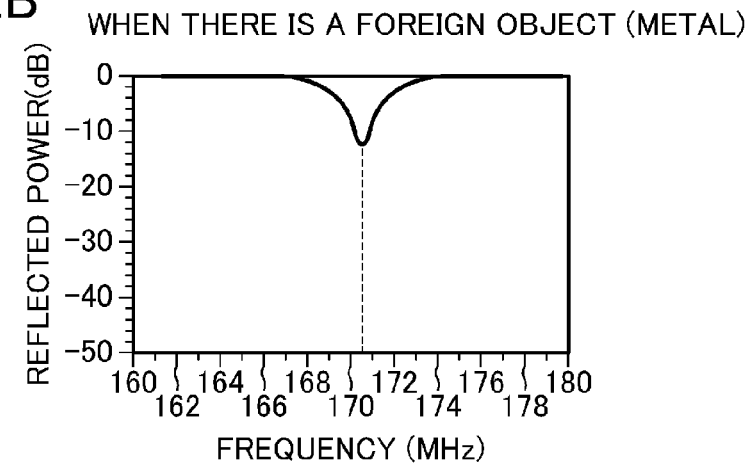
FIG.12B  WHEN THERE IS A FOREIGN OBJECT (METAL)
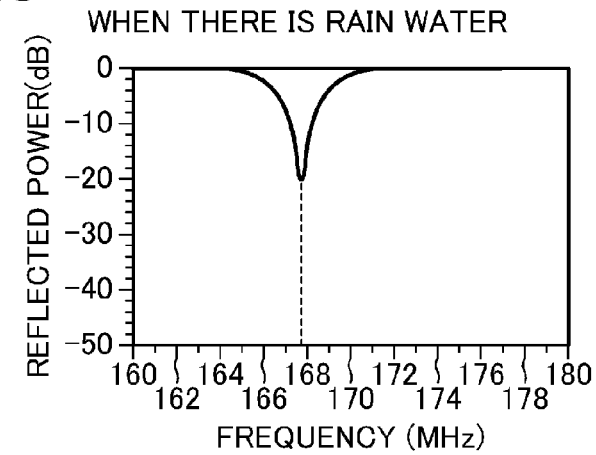
FIG.12C  WHEN THERE IS RAIN WATER FIG.13A WHEN THERE IS NEITHER A FOREIGN OBJECT NOR RAIN WATER
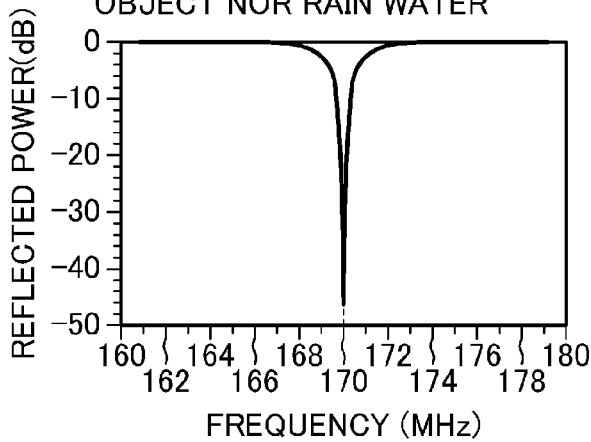
FIG.13B WHEN THERE IS A FOREIGN OBJECT (METAL)
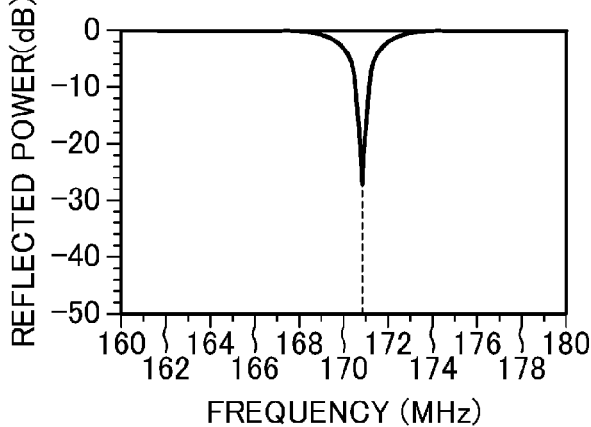
FIG.13C WHEN THERE IS RAIN WATER
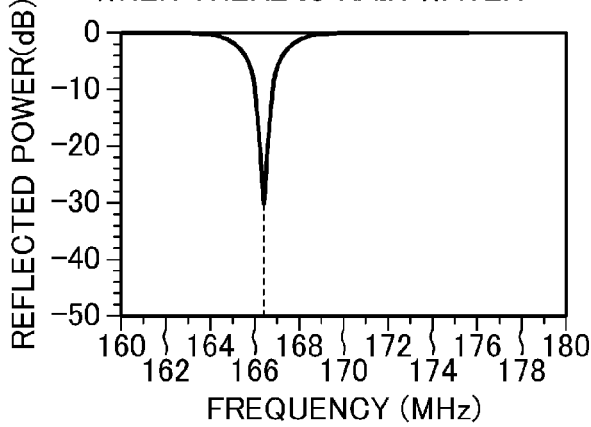

FOREIGN OBJECT DETECTION DEVICE, FOREIGN OBJECT DETECTION METHOD, AND NON-CONTACT CHARGING SYSTEM

CROSS-REFERENCE TO RELATED APPLICATIONS

This is a continuation of International Application No. PCT/JP2014/000831 filed on Feb. 18, 2014, which claims priority to Japanese Patent Application No. 2013-029601 filed on Feb. 19, 2013. The entire disclosures of these applications are incorporated by reference herein.

BACKGROUND

The present disclosure relates to a foreign object detector, a method of detecting a foreign object, and a non-contact charging system.

In recent years, wireless power transmission systems (i.e., non-contact charging systems) have been, and are being, developed to charge, for example, electric vehicles via a non-contact method. In each wireless power transmission system, a transmitting coil and an RF oscillation source are provided for a charger, and a receiving coil is provided for an electric vehicle. Some wireless power transmission systems using an electromagnetic induction method enable high-efficiency non-contact power transmission.

Such a wireless power transmission system using the electromagnetic induction method is designed to transmit a large quantity of electric power. Therefore, if a metallic foreign object enters the gap between its transmitting and receiving coils and/or its environment, there is a risk that the system would generate heat. In view of this consideration, it is thus important, for safety reasons, to detect such a metallic foreign object before or during charging.

As a conventional method of detecting a foreign object in a wireless power transmission system, there is a method of detecting a change in the inductance of a detection coil to be caused by electromagnetic induction between the metal and the detection coil (see, e.g., Japanese Unexamined Patent Publication No. 2012-16125).

SUMMARY

Since an electric vehicle is sometimes charged while being parked outside, such a foreign object needs to be detected regardless of the weather. Specifically, even if it rains, it is necessary to detect the foreign object without being affected by the rainwater, that is, to distinguish the metal from the water.

In the method of Japanese Unexamined Patent Publication No. 2012-16125, however, influence of rainwater in detecting such a foreign object is not considered.

The present inventor found this problem and made the present disclosure. The present disclosure provides a foreign object detector detecting such a foreign object while distinguishing the metal from the water, a method of detecting the foreign object, and a non-contact charging system.

In order to solve the problem described above, a foreign object detector according to the present disclosure includes a detection coil; a transmitting circuit generating RF power of a predetermined frequency; a directional coupler outputting the RF power supplied from the transmitting circuit to the detection coil, and extracting reflected power that is a power component reflected by the detection coil; and a detection circuit receiving the reflected power extracted by the directional coupler and detecting a foreign object by sensing a change in frequency characteristic of the reflected power.

A method of detecting a foreign object according to the present disclosure includes outputting RF power generated at a predetermined frequency to a detection coil; and detecting the foreign object by sensing a change in frequency characteristic of reflected power that is a power component reflected by the detection coil.

The present disclosure allows for detecting a foreign object by sensing a change in the frequency characteristic of reflected power while distinguishing metal from water.

BRIEF DESCRIPTION OF THE DRAWINGS

FIGS. 11A-11C illustrate the frequency characteristic of reflected power of a coil L1 where there is no mutual coupling between the coils L1 and L2 shown in FIG. 10. FIG. 11A illustrates a case where there is neither a foreign object nor rainwater. FIG. 11B illustrates a case where there is a foreign object (metal). FIG. 11C illustrates a case where there is rainwater.

FIGS. 12A-12C illustrate the frequency characteristic of reflected power of a coil L1 where mutual coupling between the coils L1 and L2 shown in FIG. 10 is taken into consideration and where no short circuit is used. FIG. 12A illustrates a case where there is neither a foreign object nor rain. FIG. 12B illustrates a case where there is a foreign object (metal). FIG. 12C illustrates a case where there is rainwater.

FIGS. 13A-13C illustrate the frequency characteristic of reflected power of a coil L1 where mutual coupling between the coils L1 and L2 shown in FIG. 10 is taken into consideration and where a short circuit is used. FIG. 13A illustrates a case where there is neither a foreign object nor rain. FIG. 13B illustrates a case where there is a foreign object (metal). FIG. 13C illustrates a case where there is rainwater.

DETAILED DESCRIPTION

Embodiments of a foreign object detector, method of detecting a foreign object, and non-contact charging system according to the present disclosure will now be described with reference to the drawings. These embodiments are not intended to limit the scope of the present disclosure. Those skilled in the art would readily understand that those embodiments may also be expressed in a similar language or depicted similarly in the same or similar technical fields.

Figure 1:
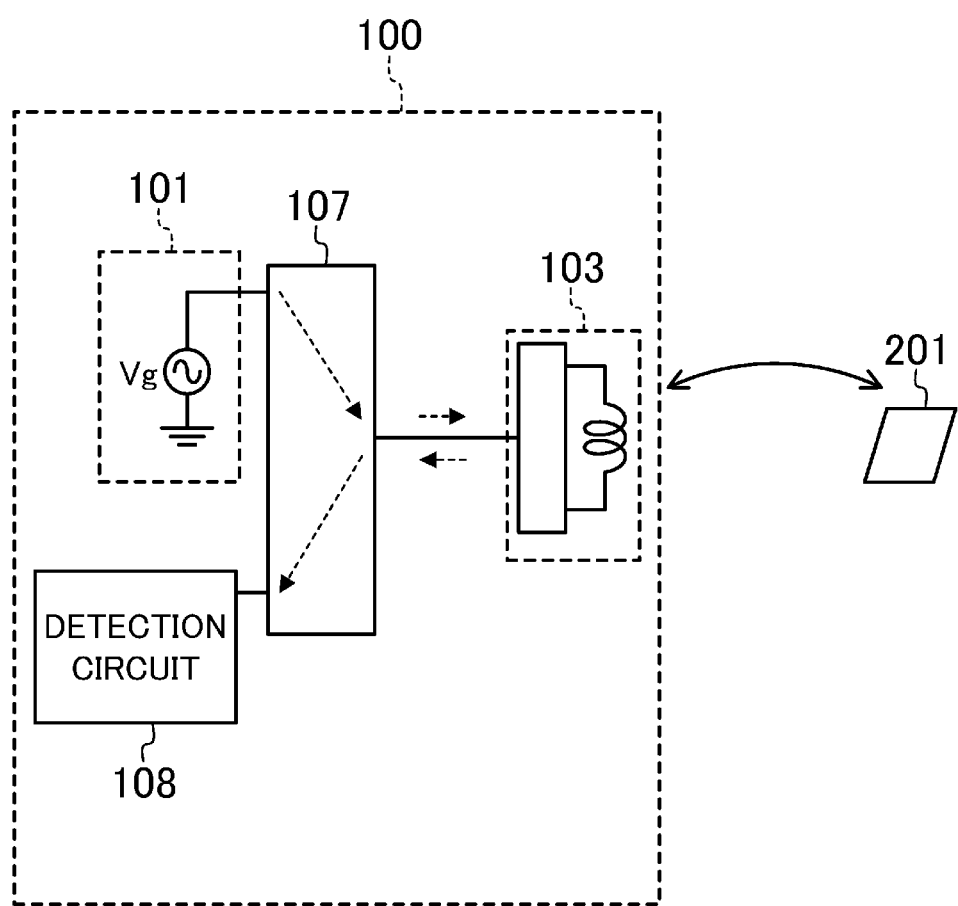
FIG. 1 is a block diagram illustrating a basic configuration of a foreign object detector according to the present disclosure.

FIG. 1 illustrates a basic configuration of a foreign object detector 100 according to the present disclosure. A transmitting circuit 101 generates RF power of a predetermined frequency using a voltage supply Vg, and outputs the RF power to a detection coil 103 via a directional coupler 107. The directional coupler 107 outputs the power supplied from the transmitting circuit 101 to the detection coil 103, extracts a power component reflected by the detection coil 103, and outputs the reflected power component to a detection circuit 108. The detection circuit 108 receives the reflected power extracted by the directional coupler 107, and detects a foreign object by sensing a change in the frequency characteristic of the reflected power. Specifically, the detection circuit 108 detects a foreign object based on the amount of change in the matching frequency of the reflected power.

This configuration allows for detecting a metallic foreign object 201 while distinguishing the foreign object from water.

First Embodiment

Figure 2:
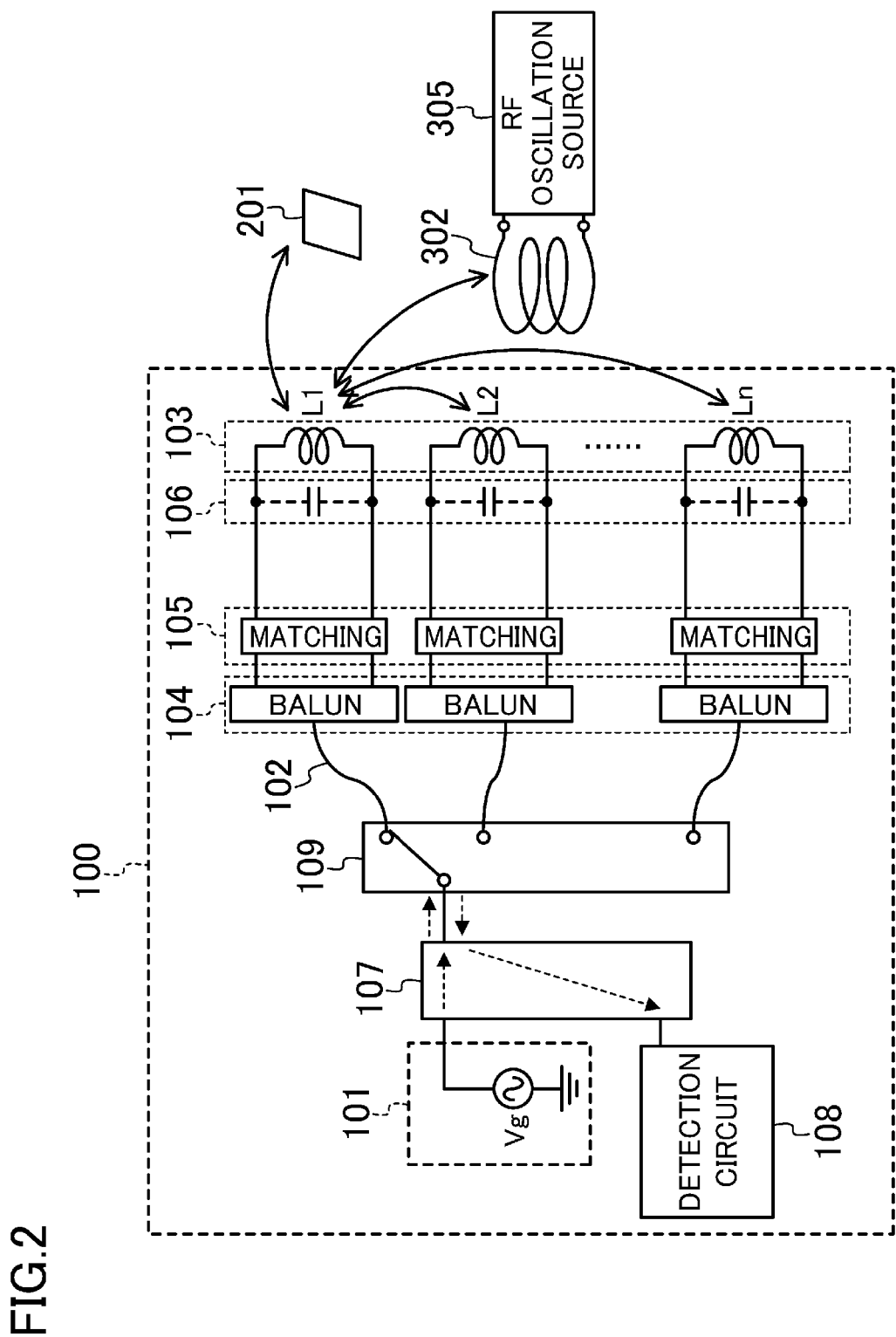
FIG. 2 illustrates a detailed configuration of a foreign object detector according to a first embodiment of the present disclosure.

FIG. 2 illustrates a detailed configuration of a foreign object detector 100 according to a first embodiment. A transmitting circuit 101 outputs RF power while changing the frequency within a predetermined sweeping frequency range, and outputs the RF power to balanced-to-unbalanced transformers (baluns) 104 via respective coaxial cables 102 and a directional coupler 107. Each coaxial cable 102 transmits an unbalanced RF signal. Each coaxial cable 102 is a transmission line including a center conductor shielded with an external conductor. Each detection coil 103 generates an RF magnetic field to detect the metallic foreign object 201. The detection coils 103 form an arrangement of n coils L1, L2, . . . , and Ln (where n is an integer equal to or greater than two).

Each balun 104 is connected to a matching circuit 105, which will be described later, and the coaxial cable 102. The balun 104 transforms the unbalanced signal, which is RF power supplied from the coaxial cable 102, to a balanced signal, and outputs the balanced signal to the matching circuit 105.

Each matching circuit 105 performs impedance matching between the associated detection coil 103 and balun 104. The matching circuit 105 converts the impedance of the detection coil 103 at a predetermined matching frequency f0 to match the impedance with the balanced impedance of the balun 104.

The closer the point of connection between the balun 104 and the matching circuit 105 to the detection coil 103 is, the better. As will be described later, the detector according to the present disclosure detects a foreign object by sensing a change in the frequency characteristic responding to a change in the inductance of the detection coil 103 that has been caused by a target to be detected. However, if the detection coil 103 is connected to the balun 104 and the matching circuit 105 via a long wire, the wire comes to have an inductance component to reduce the amount of change in the inductance of the detection coil 103 caused by the target to be detected. Thus, the balun 104 and the matching circuit 105 are connected at a closest possible point to the detection coil 103, which allows for reducing deterioration in the foreign object detecting performance.

A parasitic capacitor 106 is parasitic capacitance generated by each detection coil 103. In the equivalent circuit, capacitance components are defined in parallel with the respective detection coils 103. If a dielectric exists near the detection coils 103, the capacitance value of the parasitic capacitor 106 increases. Examples of the dielectric include a transmitting coil case, which will be described later, and rainwater on the transmitting coil case.

The directional coupler 107 outputs an unbalanced signal, which is RF power supplied from the transmitting circuit 101, to the balun 104, extracts a power component reflected by the detection coil 103, and outputs the power component to the detection circuit 108, which will be described later.

The detection circuit 108 receives the reflected power extracted by the directional coupler 107, and detects a foreign object based on the amount of change in the matching frequency at which the minimum power is reflected.

Out of the coils L1, L2, . . . , and Ln arranged as the detection coils 103, the switch circuit 109 turns itself by selecting one of the coils to be supplied with power.

The foreign object detector 100 described above is combined with a transmitting coil 302 and an RF oscillation source 305 to form a non-contact charging system. The RF oscillation source 305 supplies RF power of a predetermined frequency to the transmitting coil 302 to start non-contact charging.

Figure 3:
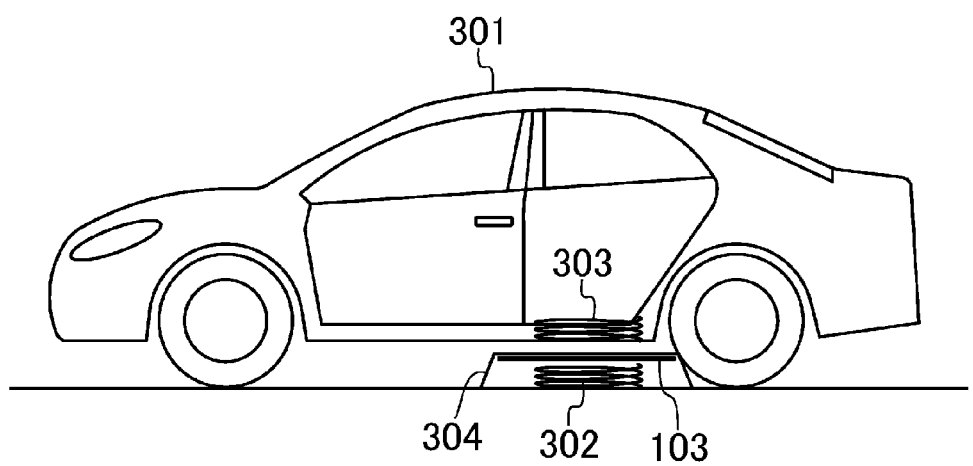
FIG. 3 is a front view illustrating an example where a wireless power transmission system is employed in a vehicle.

FIG. 3 is a front view illustrating an example where a wireless power transmission system is employed in a vehicle 301. In the example of FIG. 3, the transmitting coil 302 is placed on the ground, and a receiving coil 303 is mounted on the vehicle 301. The transmitting coil case 304 is, for example, a resin dielectric, and houses the transmitting coil 302. The detection coils 103 are arranged above the transmitting coil 302, and housed in the transmitting coil case 304.

Figure 4:
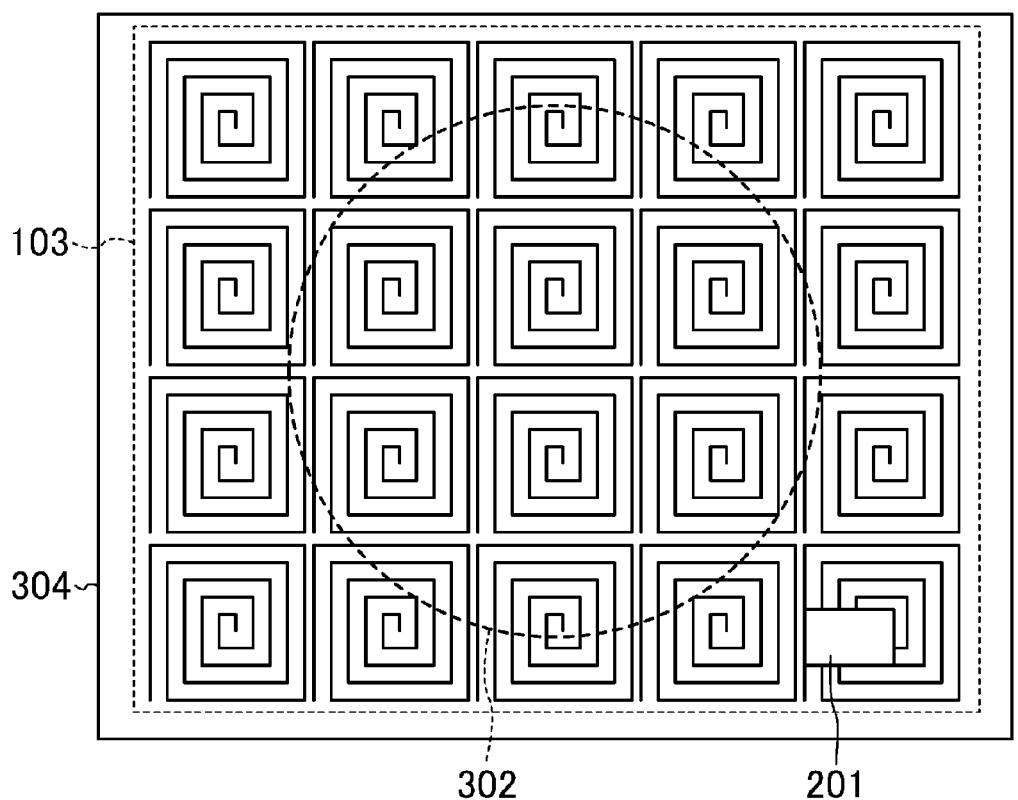
FIG. 4 is an enlarged plan view of the transmitting coil case shown in FIG. 3.

FIG. 4 is an enlarged plan view of the transmitting coil case 304. In order to detect a foreign object on and/or around the transmitting coil 302, the detection coils 103 are arranged so as to cover the transmitting coil 302 and its surroundings without leaving any space between them. These detection coils 103 are switched by the switch circuit 109 to detect the metallic foreign object 201 on and/or around the transmitting coil 302.

In FIG. 2, magnetic field coupling occurs not only between the detection coils 103 and the metallic foreign object 201 but also between the detection coils 103 and the transmitting coil 302. The detection coils 103 induce currents in the transmitting coil 302. If magnetic field coupling occurs between the detection coils 103 and the transmitting coil 302, a change in received power caused by the metallic foreign object 201 decreases so much as to deteriorate the foreign object detecting performance.

Figure 5:
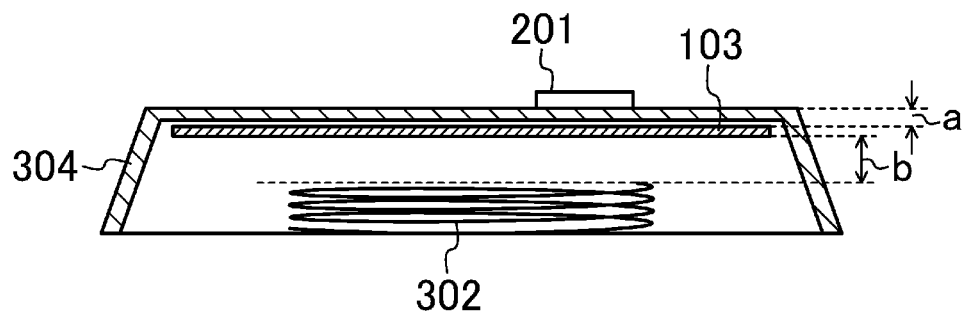
FIG. 5 is an enlarged cross-sectional view of the transmitting coil case shown in FIG. 3.

FIG. 5 is an enlarged cross-sectional view of the transmitting coil case 304. Assume that the distance between the metallic foreign object 201 and the detection coil 103 (e.g., the distance between the (external) surface of the transmitting coil case 304 and (the top surface of) the detection coils 103) is "a," and the distance between the transmitting coil 302 and the detection coils 103 (e.g., the distance between the upper surface of the transmitting coil 302 and the lower surface of the detection coils 103) is "b." The detection coils 103 are suitably arranged so that the distance "a" is shorter than the distance "b" to reduce the influence of magnetic field coupling between the detection coils 103 and the transmitting coil 302. This configuration allows for reducing influence of magnetic field coupling between the detection coils 103 and the transmitting coil 302, thereby reducing deterioration in the foreign object detecting performance.

A method of detecting a foreign object using the foreign object detector 100 configured as described above will now be outlined. RF power generated at a predetermined frequency is output to the detection coils 103. A foreign object is detected by sensing a change in the frequency characteristic of the power reflected by the detection coil 103.

Figure 6:
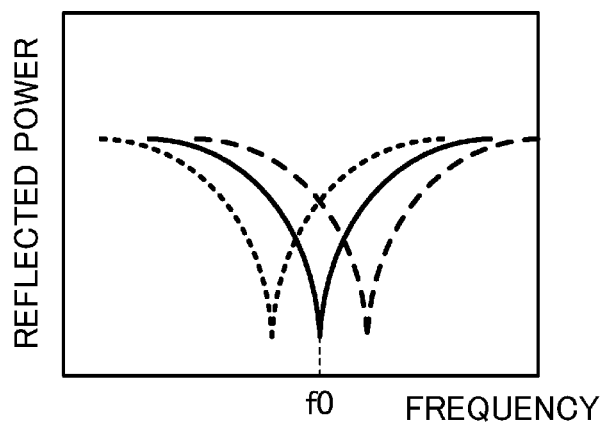
FIG. 6 illustrates a change in the frequency characteristic of the reflected power caused by a foreign object in the present disclosure.

FIG. 6 illustrates a change in the frequency characteristic of the reflected power caused by a foreign object. If the metallic foreign object 201 exists near the detection coils 103, electromagnetic induction is generated between the detection coils 103 and the metallic foreign object 201 to cause a decrease in the inductance of the detection coils 103. As a result, the matching frequency increases as compared to a case where there is no metallic foreign object 201.

On the other hand, if rainwater exists near the detection coil 103, capacitance coupling occurs between the detection coils 103 and the rainwater to increase the capacitance value of the parasitic capacitors 106 of the detection coils 103, because rainwater has a high dielectric constant. As a result, the matching frequency decreases as compared to a case where there is no rainwater.

The detection circuit 108 detects the metallic foreign object 201 distinctively from rainwater by sensing such a change in matching frequency. A matching frequency f0 when neither a metallic foreign object 201 nor rainwater exists is regarded to as a reference value. If the matching frequency of the reflected power is higher than the reference matching frequency f0, the detection circuit 108 determines that there is the metallic foreign object 201 near the detection coils 103. On the other hand, if the matching frequency of the reflected power is lower than the reference matching frequency f0, the detection circuit 108 determines that there is rainwater near the detection coils 103.

The reference matching frequency f0 may be initially set when the foreign object detector 100 according to the present disclosure is installed. At that time, it may be confirmed visually, or checked in advance by another detector, that there is neither a metallic foreign object, for example, nor rainwater there. Alternatively, the reference matching frequency f0 may be set at the time of shipment of the foreign object detector 100 according to the present disclosure.

Next, it will be described how to reduce the influence of the length of the wires. During charging, an AC magnetic field generated by the transmitting coil 302 induces a high voltage in the detection coils 103. This high induced voltage could cause breakdown in the circuits connected to the detection coils 103. If the frequency of the RF power output from the transmitting circuit 101 to detect a foreign object is increased to avoid such a breakdown, the wavelength of the RF power becomes shorter. As a result, the length of the wires supplying the power to the detection coils 103 increases electromagnetically.

At this time, the wires function as a linear antenna such as a dipole antenna. Then, the radiation resistance of the detection coils 103 increases, and the Q factor of the detection coils 103 decreases, so much as to deteriorate the foreign object detecting performance. That is, since the detection coils 103 do not function as inductors, no foreign objects are detectable, which is a problem.

In particular, the transmitting coil 302 utilized for charging an electric vehicle has so large a size (e.g., diameter if the coil is in a circular shape) that there is a need to arrange a lot of detection coils 103. In this case, the length of the wires increases physically.

In order to address this problem, the method employed in the foreign object detector 100 of FIG. 2 according to the present disclosure is to connect the detection coils 103 to the respective circuits via the coaxial cables 102, which greatly reduces leakage electromagnetic fields, and to detect a foreign object based on the frequency characteristic of the power reflected by the detection coils 103. Furthermore, balanced power is supplied to the detection coils 103 via the respective balun 104 to reduce leakage currents induced on outer conducting shields of the coaxial cables 102. With this configuration, the power being supplied to the detection coils 103 is transmitted through the outer conducting shields of the coaxial cables 102 to prevent the coaxial cables 102 from functioning as a linear antenna even if the coaxial cables 102 are electromagnetically long.

Second Embodiment

Now, it will be described how to prevent the circuits from causing breakdown in a foreign object detector 200 shown in FIG. 7.

As shown in FIG. 2, the foreign object detector 100, the transmitting coil 302, and the RF oscillation source 305, which have been described in the first embodiment, are combined to form a non-contact charging system. The RF oscillation source 305 supplies RF power of a predetermined frequency to the transmitting coil 302 to start non-contact charging.

The RF oscillation source 305 transmits a large quantity of electric power. Thus, at occurrence of magnetic field coupling between the detection coils 103 and the transmitting coil 302, that large quantity of electric power is supplied to the transmitting circuit 101, the detection circuit 108, and the switch circuit 109 to incur the risk of causing breakdown in these circuits. In order to address this problem, the frequency of the RF power supplied from the transmitting circuit 101 is set to be higher than the frequency of the RF power supplied from the RF oscillation source 305.

Figure 7:
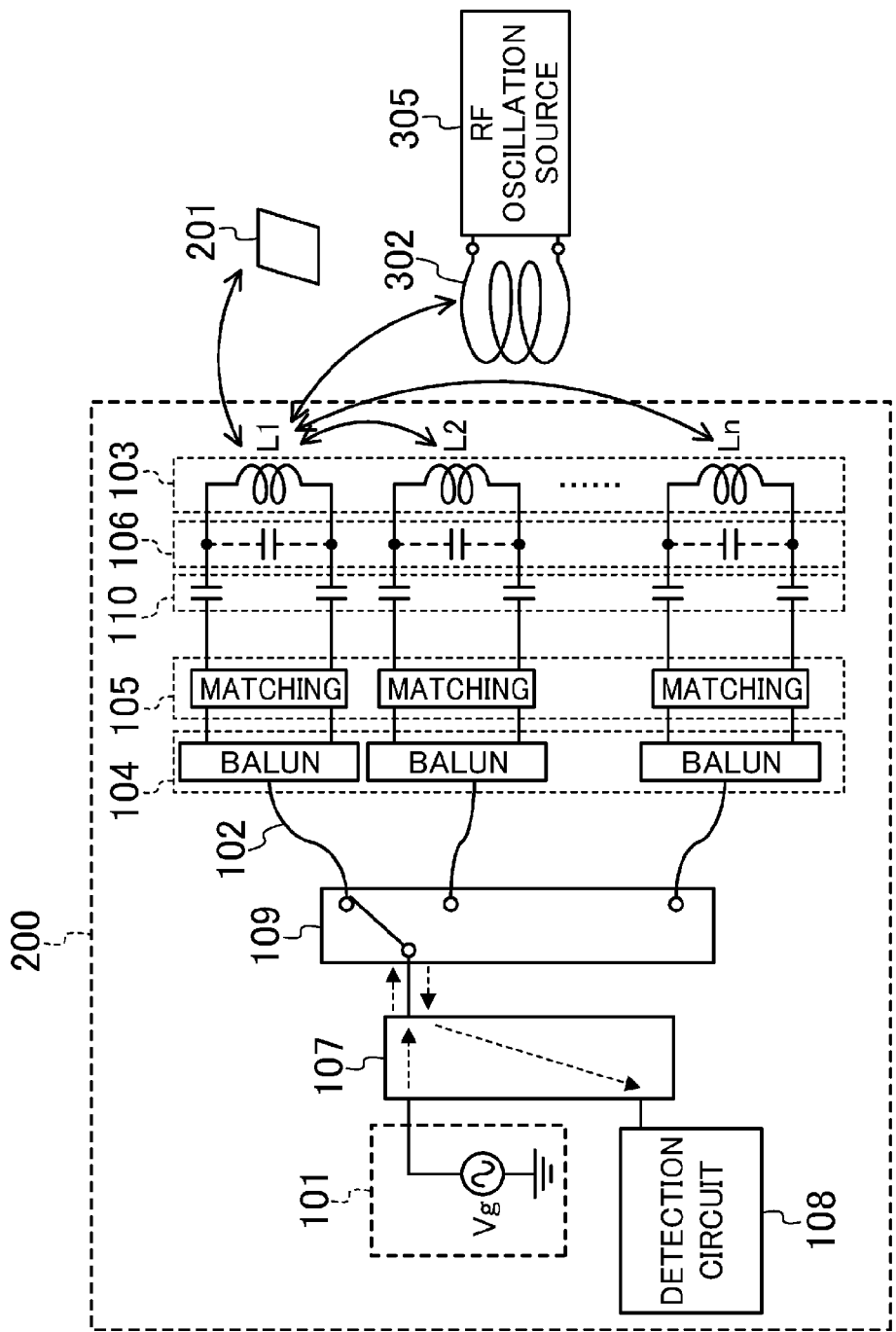
FIG. 7 illustrates a detailed configuration of a foreign object detector according to a second embodiment of the present disclosure.

As shown in the foreign object detector 200 of FIG. 7, a circuit protection filter 110 is arranged, for example, between each matching circuit 105 and its associated parasitic capacitor 106 and connected to its associated detection coil 103. The circuit protection filter 110 is a filter circuit with the characteristic of allowing the frequency of the RF power supplied from the transmitting circuit 101 to pass, and cutting the frequency of the RF power supplied from the RF oscillation source 305. This configuration protects the transmitting circuit 101, the detection circuit 108, the switch circuit 109, and other circuits and elements. FIG. 7 illustrates an example where capacitors functioning as high-pass filters are connected to both terminals of the detection coils 103.

As shown in FIG. 4, the size of each detection coil 103 (e.g., its diameter if the coil is in a circular shape) is set smaller than the size of the transmitting coil 302 (e.g., its diameter if the coil is in a circular shape). This configuration reduces the degree of the magnetic field coupling between the detection coils 103 and the transmitting coil 302 and thereby reduces the power supplied to the transmitting circuit 101, the detection circuit 108, and the switch circuit 109.

Third Embodiment

Now, it will be described how to reduce mutual coupling between the respective detection coils 103 in a foreign object detector 300 shown in FIG. 8.

As shown in FIG. 4, since the plurality of detection coils 103 are arranged close to each other, mutual coupling occurs between them. In FIG. 2, when the coil L1 is selected among the detection coils 103, the non-selected coils other than L1 are coupled to the coil L1, which induces currents. As a result, a change in received power caused by the metallic foreign object 201 decreases so much as to deteriorate the foreign object detecting performance.

Figure 8:
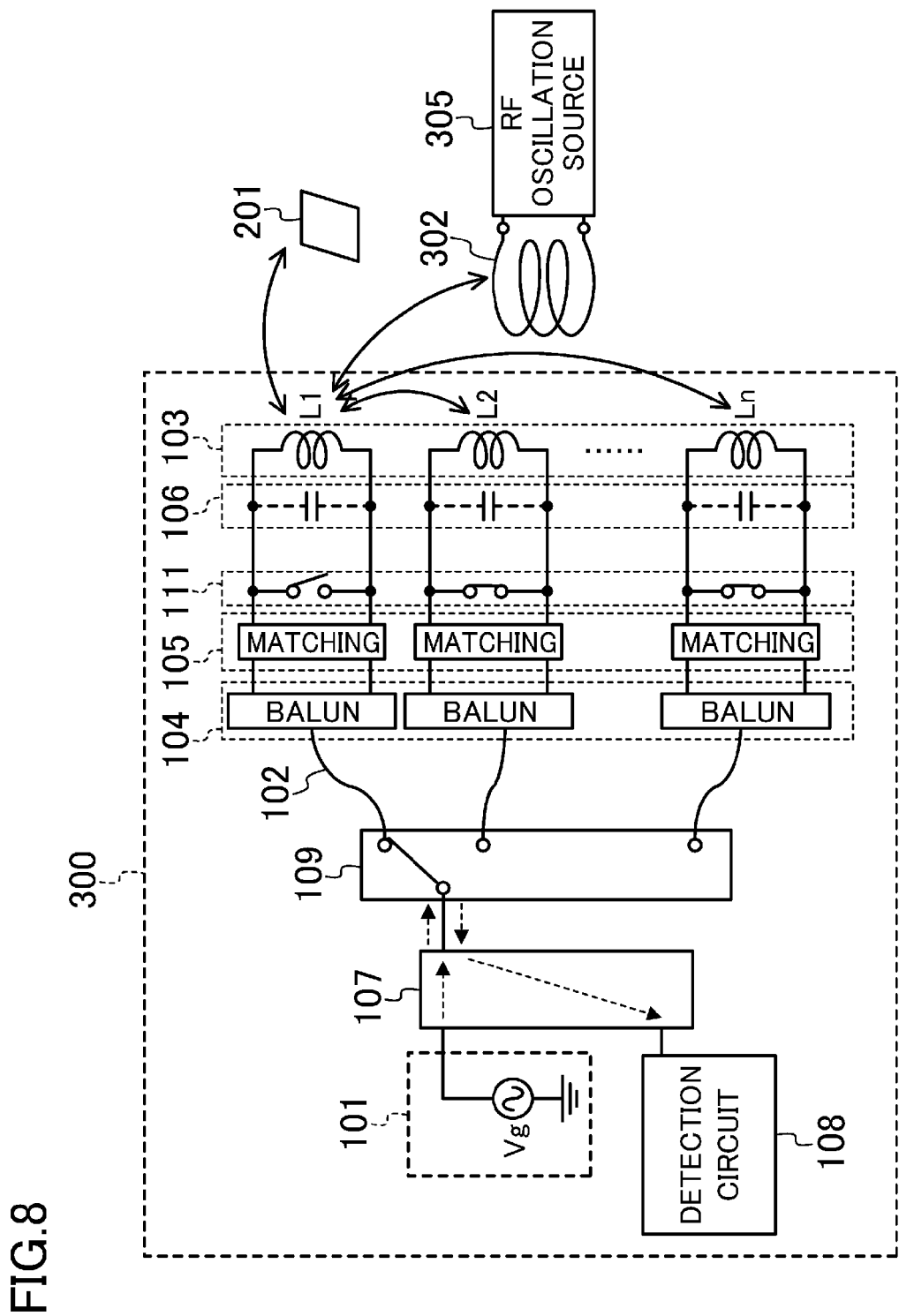
FIG. 8 illustrates a detailed configuration of a foreign object detector according to a third embodiment of the present disclosure.

Thus, according to this embodiment, as shown in FIG. 8, the two terminals of each of those non-selected detection coils 103 are short-circuited together by an associated short circuit 111. In the embodiment illustrated in FIG. 8, each short circuit 111 is provided between its associated matching circuit 105 and parasitic capacitor 106.

Then, the impedance of the non-selected detection coils 103 changes so greatly as to cause impedance mismatch between the detection coils 103 and the respective baluns 104. This allows for preventing currents from being induced in the non-selected detection coils 103 due to their mutual coupling.

Figure 9:
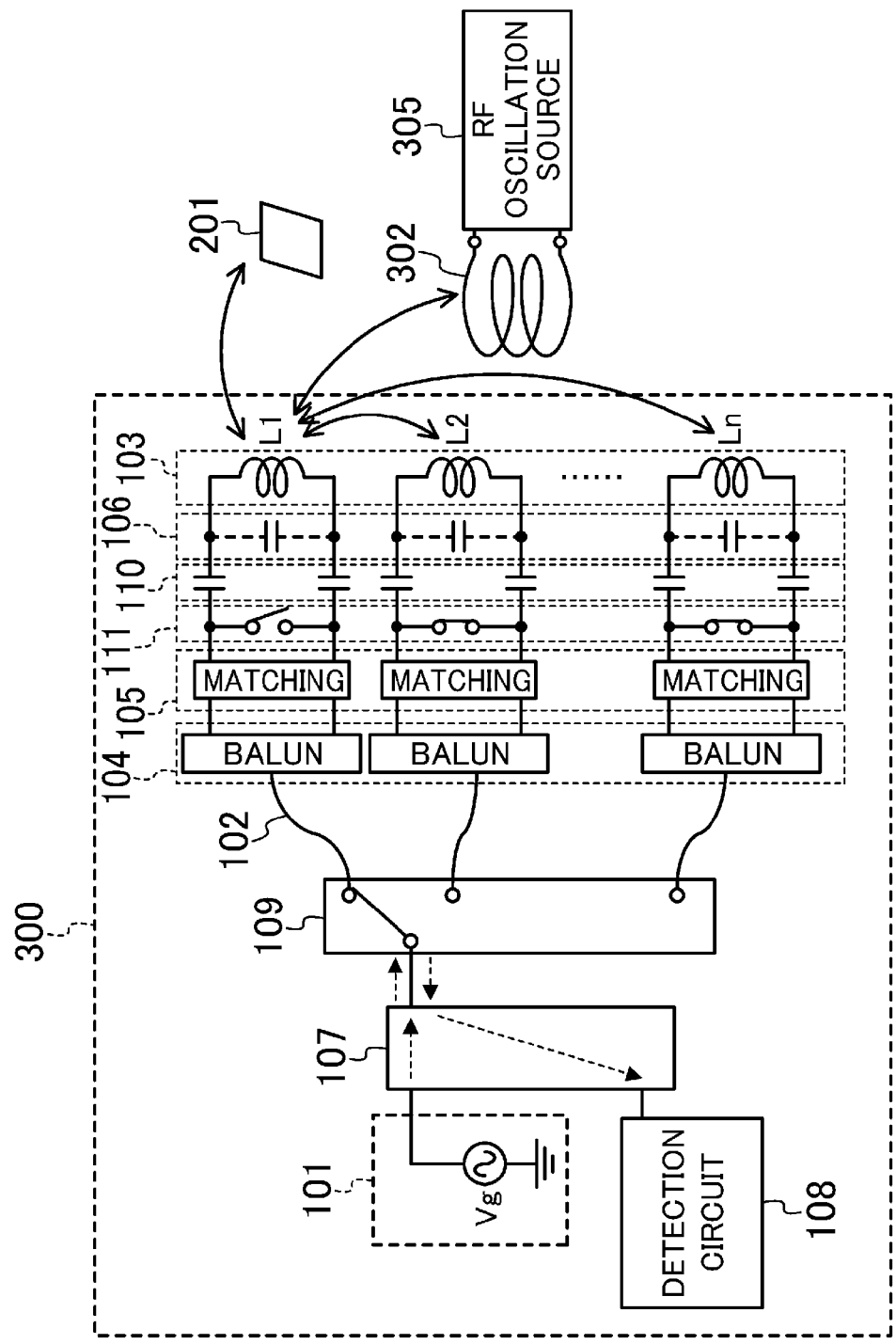
FIG. 9 illustrates a detailed configuration of a foreign object detector according to a variation of FIG. 8.

Alternatively, as in the foreign object detector 300 shown in FIG. 9, each short circuit 111 may be connected to an associated detection coil 103 with a circuit protection filter 110 interposed therebetween. That is, the short circuit 111 may be provided between the circuit protection filter 110 and an associated matching circuit 105. This configuration allows for preventing the short circuits 111 from being broken down due to a large voltage induced in the detection coils 103 by an AC magnetic field generated by the transmitting coil 302.

Effective improvement in foreign object detecting performance owing to such reduction in mutual coupling will now be described based on the results of calculation obtained by an equivalent circuit.

Figure 10:
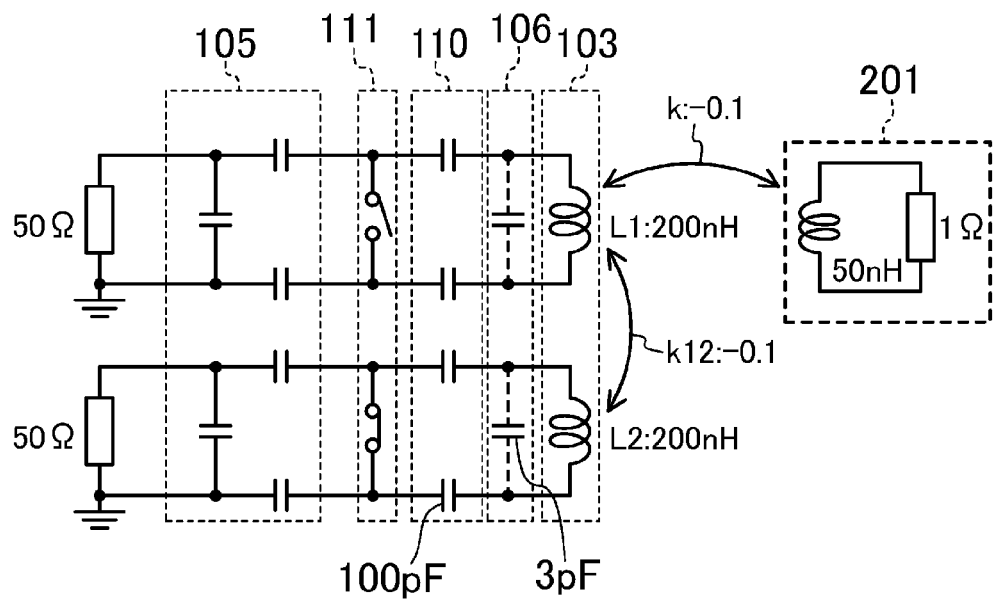
FIG. 10 illustrates an equivalent circuit model of the foreign object detector of FIG. 9.

FIG. 10 is an equivalent circuit model of the foreign object detector 300 of FIG. 9. The elements falling in the range from the detection coil 103 to the matching circuit 105 are represented by their equivalent circuit. The metallic foreign object 201 is represented by a series circuit comprised of a resistor and an inductor. The calculation was performed based on the assumption that if there was the metallic foreign object 201 near the coil L1, magnetic field coupling with a coupling coefficient k (=−0.1) would occur between the inductor of the metallic foreign object 201 and the coil L1. On the other hand, the calculation was also performed based on the assumption that if there was rainwater near the coil L1 the parasitic capacitor 106 associated with the coil L1 would increase via capacitance coupling.

The matching circuit 105 is comprised of capacitors connected in series/parallel. The calculation was performed based on the assumption that balanced impedance of the balun 104 was 50Ω, and the detection coils 103 were comprised of the coils L1 and L2. The reference matching frequency f0 where there was no foreign object was adjusted to 170 MHz.

Now, the result of calculation will be shown. FIGS. 11A-11C illustrate the frequency characteristic of the power reflected by the coil L1 when there is no mutual coupling between the respective detection coils 103. The matching frequency of FIG. 11B when there is a foreign object (metal) is higher than the reference matching frequency f0 of FIG. 11A when there is neither a foreign object nor rainwater. The matching frequency of FIG. 11C when there is rainwater is lower than the reference matching frequency f0 of FIG. 11A when there is neither a foreign object nor rainwater.

FIGS. 12A-12C illustrate the frequency characteristic of the power reflected by the coil L1 when there is mutual coupling between the respective detection coils 103. The calculation was performed based on the assumption that the coupling coefficient k12 of a magnetic field between the coils L1 and L2 was −0.1. It can be seen that the amount of change in the matching frequency was smaller than those shown in FIGS. 11A-11C.

FIGS. 13A-13C illustrate the frequency characteristic of the power reflected by the coil L1 when there is mutual coupling between the respective detection coils 103 and the short circuit 111 of the coil L2 is short-circuited. It can be seen that the amount of change in the matching frequency was almost equal to those shown in FIGS. 11A-11C.

Figure 14:
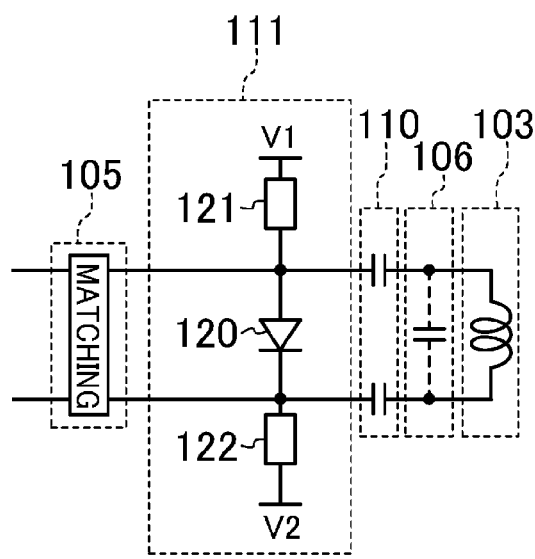
FIG. 14 is a circuit diagram illustrating a detailed exemplary configuration of the short circuit shown in FIG. 9.

FIG. 14 illustrates a short circuit 111 using a diode. A diode 120 is connected in parallel to both terminals of a detection coil 103. DC voltages V1 and V2 are applied to both terminals of the diode 120 via bias resistors 121 and 122, respectively. The potential difference between the DC voltages V1 and V2 is changed to switch the diode 120 between an ON state (short-circuited state) and an OFF state (opened state).

While both of the terminals of the detection coil 103 are supposed to be short-circuited together in the third embodiment, some capacitors of the matching circuit 105 in FIG. 10 may be short-circuited to cause impedance mismatch in the non-selected detection coils 103.

The foreign object detector and method of detecting a foreign object described above allow for detecting the foreign object while distinguishing metal from water. Even if the wire between a detection coil and a detection circuit is long, the accuracy in detecting a foreign object is maintained while preventing the wire from functioning as a linear antenna.

The foreign object detector and method of detecting a foreign object according to the present disclosure are applicable for use in a non-contact charger for mobile electronic devices, electric propulsion vehicles, and other devices and machines to be charged.

What is claimed is:
1. A foreign object detector comprising:
  a detection coil;
  a transmitting circuit generating RF power of a predetermined frequency;
  a directional coupler outputting the RF power supplied from the transmitting circuit to the detection coil, and extracting reflected power that is a power component reflected by the detection coil; and
  a detection circuit receiving the reflected power extracted by the directional coupler, and detecting a foreign object by sensing a change in frequency characteristic of the reflected power.

2. The foreign object detector of claim 1, wherein the detection circuit detects the foreign object based on the amount of change in the matching frequency of the reflected power.

3. The foreign object detector of claim 1, wherein
  the detection circuit recognizes the foreign object as metal if a matching frequency of the reflected power is higher than a reference matching frequency, and
  recognizes the foreign object as water if the matching frequency of the reflected power is lower than the reference matching frequency.

4. The foreign object detector of claim 1, wherein
  the detection coil includes a plurality of coils, and
  the foreign object detector further comprises a short circuit in which both terminals of a non-selected one of the plurality of coils in the detection coil are short-circuited together.

5. The foreign object detector of claim 1, further comprising:

a transmitting coil case housing a transmitting coil, wherein the detection coil is arranged above the transmitting coil, and housed in the transmitting coil case, and the detection coil is arranged such that a distance between a surface of the transmitting coil case and the detection coil is shorter than a distance between the transmitting coil and the detection coil.

6. A non-contact charging system comprising:

the foreign object detector of claim 1;

a transmitting coil; and an RF oscillation source supplying RF power of a predetermined frequency to the transmitting coil.

7. A method of detecting a foreign object, the method comprising:

outputting RF power generated at a predetermined frequency to a detection coil;

extracting, using a directional coupler, a power component reflected by the detection coil; and detecting the foreign object by sensing a change in frequency characteristic of the reflected power that is the power component reflected by the detection coil and extracted by the directional coupler.

* * * * *